Figure 1:
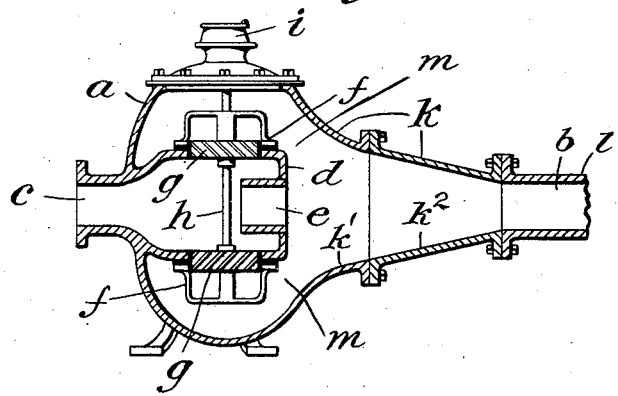

J. M. BURTON.
METER.
APPLICATION FILED APR. 20, 1912.

1,088,205.

Patented Feb. 24, 1914.

Attest:

Inventor:
James M. Burton

UNITED STATES PATENT OFFICE.

JAMES M. BURTON, OF LONG ISLAND CITY, NEW YORK, ASSIGNOR TO NEPTUNE METER COMPANY, OF NEW YORK, N. Y., A CORPORATION OF NEW JERSEY.

METER.

1,088,205.  Specification of Letters Patent.  Patented Feb. 24, 1914.

Application filed April 20, 1912. Serial No. 692,057.

*To all whom it may concern:*

Be it known that I, JAMES M. BURTON, a citizen of the United States, residing in Long Island City, Queens county, State of New York, have invented certain new and useful Improvements in Meters, of which the following is a specification, reference being had to the accompanying drawings, which form a part hereof.

This invention relates to proportional meters in which only a small proportion of the total flow actually passes through the measuring devices. Obviously, in such meters, it is necessary to the attainment of accuracy in the registration, that the proportion of flow which passes through the measuring devices shall be the same at all times and for all rates of flow and it is well known that meters of this type, as usually constructed, are very sensitive to abnormal conditions, the accuracy of registration being likely to be affected seriously thereby. Usually the meter is so constructed that the proportion of the liquid which is actually measured is forced to flow through the measuring devices by the introduction into the main flow of devices such as a choke ring in the main flow, the passage or passages for the proportional flow being comparatively small. In such meters it is found not only that the proportion of flow through the measuring devices varies more or less with different rates of total flow but that the narrow passages are gradually obstructed by continuous corrosion so that the meter becomes more and more inaccurate as its use is prolonged.

In accordance with this invention the difficulties incident to the usual construction of proportional meters are overcome by a diffusion of the flow from the main line to all parts of the meter so that, the creation of cross-currents and eddies being avoided or greatly reduced and the passages being ample, the proportion of the flow through the measuring devices remains practically constant for all rates of total flow and the passage or passages through which the proportional flow passes to the measuring device or devices are free and are less likely to become constricted by corrosion or from other causes. This result is most conveniently accomplished by the provision of a reversely tapered or flaring inlet from the main line to the meter in which the flow is diffused so that the proportional flow reaches the measuring devices with substantially the same velocity and energy that the main flow has, the ratio of flow remaining substantially constant for all rates of total flow.

The invention will be more fully explained hereinafter with reference to the accompanying drawings in which it is illustrated and in which—

Figure 2:
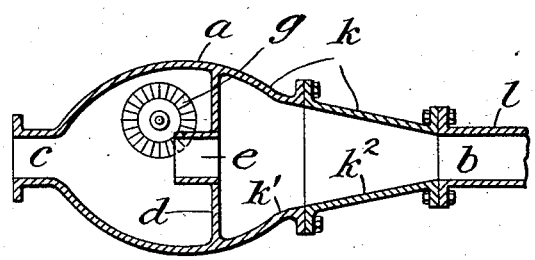

Figure 1 is a view in longitudinal vertical section of a meter in which the invention is embodied and Fig. 2 is a view of the same meter in longitudinal, horizontal section.

The meter shown in the drawing is a proportional meter of ordinary construction comprising a main casing $a$ having an inlet connection with the main line at $b$ and an outlet at $c$, an inner wall $d$ having a main flow orifice at $e$ in line with the inlet and the outlet and of substantially equal area therewith and proportional flow orifices at $f$, and measuring devices which comprise turbine wheels $g$ connected by a common shaft $h$ with registering devices which are sufficiently indicated at $i$. Usually, in meters of this type, the inlet $b$ is formed in a wall of the main casing $a$ which is substantially symmetrical with that in which the outlet is formed, the chamber within expanding abruptly, so that when the chamber within the casing has become filled with liquid the tendency of the inflowing stream is to pass directly through the orifice $e$ and such of the liquid as does not enter the orifice $e$ impinges with nearly maximum velocity upon the wall $d$ about the orifice $e$ and some of the flow is deflected, but with the creation of cross-currents and eddies, to the measuring devices at $g$. In the present case, however, means are provided to permit the flow from the main line $b$ to become diffused before it reaches the wall $d$, so that the proportional flow which is to pass through the measuring devices may reach the same with a minimum production of cross-currents and eddies while the main flow passes directly through the orifice $e$. In the construction shown in the drawings such means consist of a reversely tapered or flaring or truncated conical inlet $k$ which, for convenience, may have a part, as at $k'$, formed in the wall of the main casing $a$ and a part, as at $k^2$, formed separately and secured thereto in the usual manner. It will be seen that this prolonged flaring inlet, to which the main line *l* is connected in the usual manner, permits the flow of liquid, as it enters the meter, to become diffused gradually so that the proportional flow reaches the measuring wheels *g* as already stated with the minimum production of cross-currents and eddies, the ratio of the proportional flow to the main flow therefore remaining substantially constant for all rates of total flow. A portion of the total flow impinges upon the wall *d* and is deflected thereby, but such portion is relatively small and its velocity is also relatively small so that not only does it have little tendency to produce cross-currents but also occasions little loss of head. The formation of the inlet as described permits the passages at *m*, through which the proportional flow passes to the measuring devices, to be free and therefore not likely to become obstructed by corrosion or other causes. It is found in practice that a flare of the walls of the inlet for the greater portion of its length of about 20 degrees gives satisfactory results.

It will be obvious that the inlet can be formed otherwise than with an independent section and that its shape and proportions may be varied more or less to suit different conditions of use. The invention, therefore, is not restricted to the precise construction shown and described herein.

I claim as my invention:—

1. A proportional meter having an inlet and an outlet, an inner wall with a main flow orifice in line with the inlet and the outlet and a proportional flow orifice, and a measuring device for the proportional flow, the inlet comprising a prolonged truncated conical passage.

2. A proportional meter having an inlet and an outlet, an inner wall with a main flow orifice in line with the inlet and the outlet and a proportional flow orifice, and a measuring device for the proportional flow, the wall of the meter casing being flared at the inlet side and communicating with the inlet, the inlet comprising a prolonged truncated conical passage.

This specification signed and witnessed this 18 day of April A. D., 1912.

JAMES M. BURTON.

Signed in the presence of—
J. SHIPMAN,
J. HENRY FAHRS.

---

Copies of this patent may be obtained for five cents each, by addressing the "Commissioner of Patents, Washington, D. C."